Figure 1:
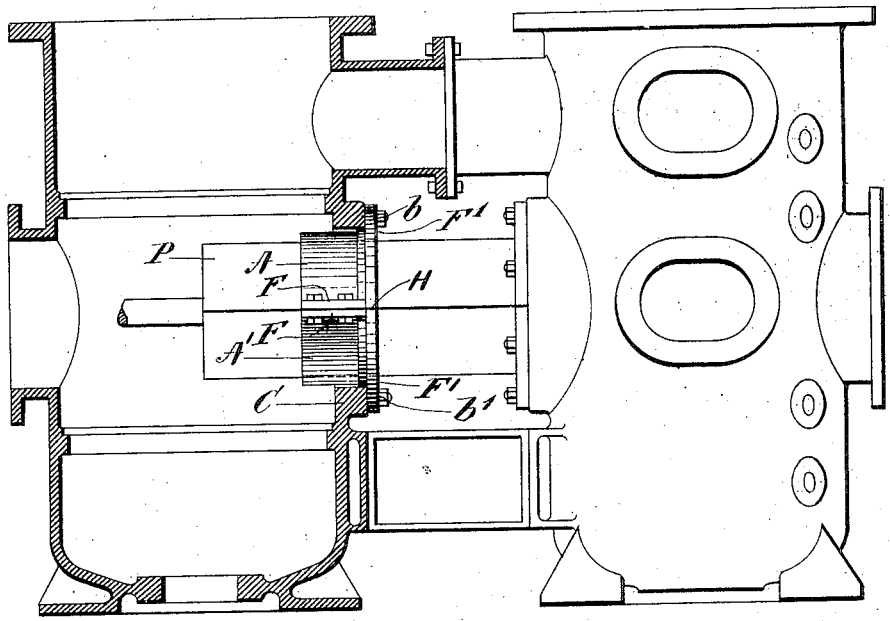

No. 887,139. PATENTED MAY 12, 1908.
G. T. STAPLES.
PACKING BOX FOR PLUNGERS.
APPLICATION FILED NOV. 18, 1907.

2 SHEETS—SHEET 1.

WITNESSES:
INVENTOR

No. 887,139. PATENTED MAY 12, 1908.
G. T. STAPLES.
PACKING BOX FOR PLUNGERS.
APPLICATION FILED NOV. 18, 1907.

2 SHEETS—SHEET 2

WITNESSES:          INVENTOR:

UNITED STATES PATENT OFFICE.

GEORGE T. STAPLES, OF DEDHAM, MASSACHUSETTS.

PACKING-BOX FOR PLUNGERS.

No. 887,139.

Specification of Letters Patent.

Patented May 12, 1908.

Application filed November 18, 1907. Serial No. 402,591.

*To all whom it may concern:*

Be it known that I, GEORGE T. STAPLES, a citizen of the United States, and resident of Dedham, in the county of Norfolk and State of Massachusetts, have invented new and useful Improvements in Packing-Boxes for Plungers, of which the following is a specification.

My invention relates to packings or packing boxes for plungers or similar reciprocating members employed in fluid engines, and has for its object the provision of a plunger packing structure which without the employment of compressed packing substances or elastic packing rings shall be substantially and effectively fluid tight, shall afford resistant qualities against wear uniformly over the entire bearing surface and facilities for quick and accurate adjustment whenever in the course of time readjustment becomes necessary.

My improvements will I believe be found particularly well adapted to situations where large and heavy plungers are reciprocally operated in a horizontal position or at all events in positions which depart materially from vertical arrangement; such a situation is often found in plunger pumps of large capacity.

Pump plungers are usually and I believe almost universally cylindrical in form and where a large and heavy plunger of this form works reciprocally in a cylindrical bearing, the wear thereof upon the packing surfaces which support it is considerable and much difficulty has been encountered in keeping the packing boxes for such plungers permanently tight. A horizontal cylindrical plunger is supported by the lower half of its packing or bearing, and exerts pressure thereon which varies from the horizontal diametrical plane to the part immediately below the center of the plunger, consequently the tendency to wear is not uniform throughout the supporting surface, this tendency is of course to wear the surfaces into a more or less elliptical form and, as the true cylindrical form is departed from, the difficulty of restoring the packing to its original efficient condition increases with the term of use of the engine.

Adjustable cylindrical bearings with correspondingly cylindrical plungers have been contrived but their adjustability does not fully or adequately compensate for the consequences of wearing pressure unevenly distributed over the bearing surface. Square plungers and square packing boxes have also been contrived and while these by reason of their flat surfaces afford an even distribution of wearing pressure, they present the alternative difficulty of keeping them tight, especially at the corners where the plane surfaces of the bearing meet.

My invention presently to be described consists of or is embodied in a plunger and bearing arrangement in which the advantages of plane bearing surfaces, adjustability and working effectiveness are combined.

Figure 2:
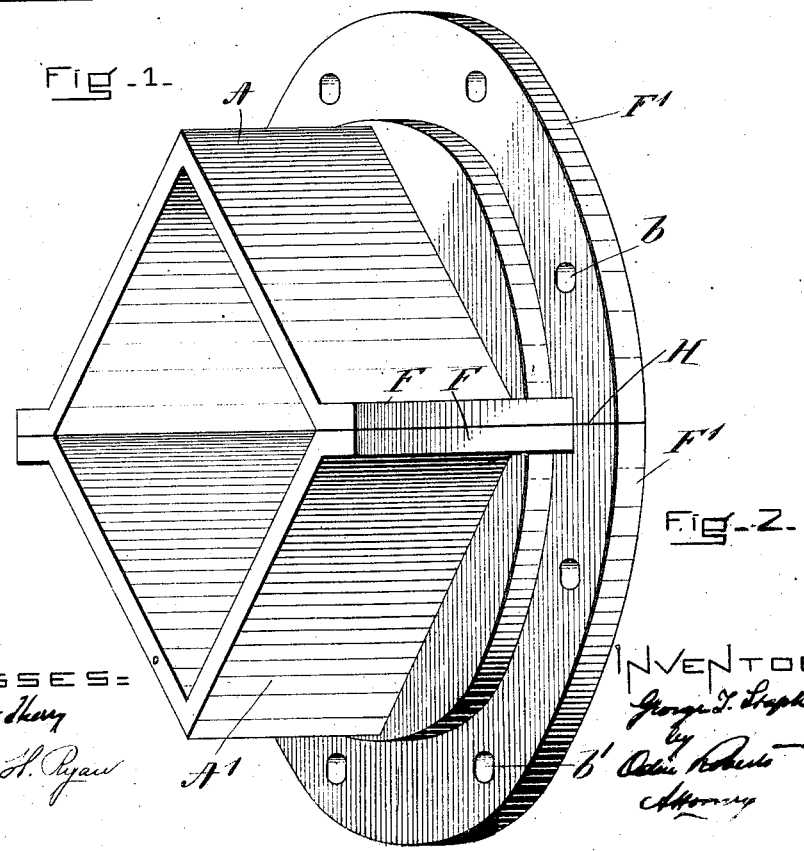
Figures 3, 4:
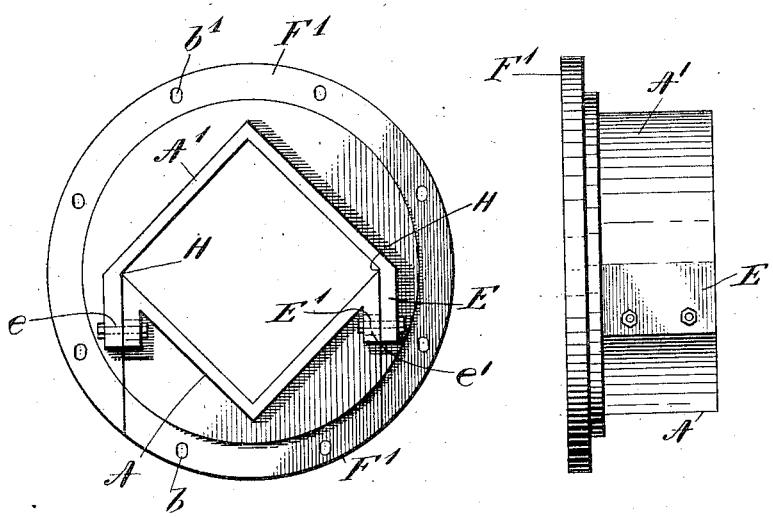

In the drawings hereto annexed: Figure 1 represents in elevation and partly in cross section a portion of a pump with my improvements incorporated therein; Fig. 2 is a view in perspective of a plunger packing box containing my improvements; Fig. 3 is an end elevation of a plunger packing box containing my improvements in a modified form; Fig. 4 is a side elevation of the packing box shown in Fig. 3; and Fig. 5 is a bottom plan view of the same.

A characteristic of my invention is that I employ a square-section plunger or similar reciprocating part in a horizontal position or at all events in a position which departs from the vertical and place this plunger so that one of its diagonal planes is substantially horizontal. If, as is preferable, the plunger or analogous device be perfectly square in cross section its two diagonal planes will be respectively horizontal and vertical and its diameters and sides inclined at an angle of 45 degrees to the horizontal, and the packing box which is likewise quadrangular or square in cross section will have its diagonal planes and sides similarly disposed.

Referring to Figs. 1 and 2, P is a plunger, square in cross section working horizontally in the pump cylinder marked C. The packing box for these plungers consists of two members A and A′ which in the instance shown in Figs. 1 and 2 are alike in shape and proportions having lateral meeting inner flanges F F and outer flanges F′ and F′, the latter adapted to be secured as by bolts in the usual manner to the outside of the head of the cylinder C. The longitudinal meeting edges of the inner bearing surfaces of the box members A A' lie in a substantially horizontal plane which coincides with the plane of the two side corners of the plunger P. The flanges F F are preferably secured together by means of bolts although the proper securement of the flanges F' F' may in some instances enable the structure to dispense with bolts in the lateral flanges F, F. The plunger P has its weight supported entirely by the lower member A' of the packing box and it will be observed that the bearing surface which supports the plunger is not only large but is also by reason of its plane surfaces subject to uniform pressure and therefore wear over its entire area. As a result of this disposition of the bearing surfaces, the lower member A' will resist wear and remain tight for an unusually long time although the surfaces in contact are merely metal to metal and are provided with no special packing such as strips or "rings". When, as is inevitable in the course of time, the inner surfaces of the member A' have become worn so that appreciable leakage between the piston and its packing box is manifest, the packing may be restored to its original condition and efficiency merely by removing the lower member A' and planing or filing off the upper surfaces of its flanges F and F' so as to allow for adjustment when the packing box member is replaced. The bolt holes in the outer flange F' of the lower member A' are preferably made slightly elliptical or elongated so that when the box member is replaced it merely has to be jacked up under the plunger until proper contact of the latter with the upper bearing member is made, when the flange F may then be bolted tightly in place. If desired, when the packing box is first installed, the two flanges F, F may be separated by a thin shim inserted at H so that a much longer period of use may be endured before it is necessary actually to reduce the substance of the flanges F F' for purposes of adjustment.

Figure 5:
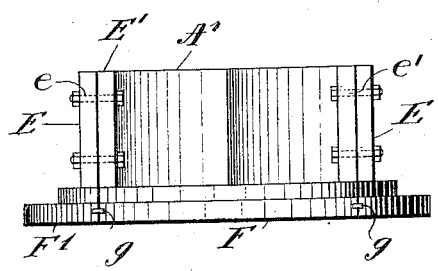

In the alternative form of packing boxes shown in Figs. 3 to 5 inclusive, are two members of the quadrangular packing member which may be mutually adjusted without necessitating the use of shims or the planing or filing of either member and even without removal of one member of the bearing from its operative position. In this form, while the inner meeting edges of the quadrangular packing box adjoin at H as in the form shown in Figs. 1 and 2, the inner flanges of the packing box instead of coinciding with the plane of these meeting edges are turned at an angle of ninety degrees thereto, the flanges E lying outside the flanges E' which may slide in the flanges E when desired. The meeting surfaces of the two members A A in this form extend through the outer flanges F'. If necessary or desirable the flanges E E' may be provided with bolts to secure them together, the bolt holes $e'$ in the flanges E', like the bolt holes $b'$, being elongated to allow for adjustment. If a packing box of this character be employed, I believe it to be preferable to employ the smaller of the two members, that is to say member A' as the adjustable member as its size relatively to the other member renders it easier to handle. If desired also grooves at $g$ may be made in the meeting faces of the outer flanges F' and a plastic packing material inserted therein when the two packing members are in place in order to guard against leakage through the outside joint.

It will be observed that the above described plunger packing box affords a maximum of bearing surfaces relatively to the size and weight of the plunger, bearing surfaces which sustain wear uniformly over all parts and which are readily mutually adjustable, the adjustment restoring the bearing surfaces to their original condition of efficiency.

What I claim and desire to secure by Letters Patent is:—

1. A packing box for plungers, and the like, consisting of a case, quadrangular in section, composed of upper and lower members, whereof the inner longitudinal edges meet in the same substantially horizontal plane.

2. A packing box for plungers, and the like, consisting of a case, quadrangular in section, composed of upper and lower members, whereof the inner longitudinal edges meet in the same substantially horizontal plane and means for mutually adjusting the said members.

3. A packing box for plungers, and the like, consisting of a case, quadrangular in cross section, composed of upper and lower members whereof the inner longitudinal edges meet in the same substantially horizontal plane, said members provided each with an end flange adapted to securement with a cylinder head, and means included in the end flange thereof, for vertically adjusting the lower member.

4. A packing box for plungers, and the like, consisting of a case, quadrangular in cross section, composed of two members, whereof the inner longitudinal edges meet in the same plane, the said members provided with parallel side flanges, the side flanges of one slidable within the side flanges of the other, the meeting planes of said side flanges intersecting the meeting plane of the inner longitudinal edges at the lines of juncture of said inner edges on either side and means for mutually adjusting said members.

5. The combination of a plunger, quadrangular in cross section, a packing box wherein the plunger slides, consisting of a case, also quadrangular in section, composed of upper and lower members the inner longitudinal edges of the said members meeting at opposite longitudinal edges of the plunger in the same substantially horizontal plane, and means for mutually adjusting the said members against the plunger.

Signed by me at Dedham, Massachusetts, this twenty eighth day of October, 1907.

GEORGE T. STAPLES.

Witnesses:
LUSHU G. BAKER,
HENRY D. HUMPHREY.